(12) United States Patent
Habraken

(10) Patent No.: US 10,483,797 B2
(45) Date of Patent: Nov. 19, 2019

(54) CONTACTLESS CONNECTOR AND CONTACTLESS CONNECTOR SYSTEM

(71) Applicant: TE Connectivity Nederland BV, s'Hertogenbosch (NL)

(72) Inventor: Gied Habraken, Valkenswaard (NL)

(73) Assignee: TE Connectivity Nederland BV, s'Hertogenbosch (NL)

( * ) Notice: Subject to any disclaimer, the term of this patent is extended or adjusted under 35 U.S.C. 154(b) by 249 days.

(21) Appl. No.: 15/380,275

(22) Filed: Dec. 15, 2016

(65) Prior Publication Data
US 2017/0179765 A1    Jun. 22, 2017

(30) Foreign Application Priority Data

Dec. 18, 2015 (EP) ..................... 15201336

(51) Int. Cl.
*H02J 50/10* (2016.01)
*H04B 5/00* (2006.01)
(Continued)

(52) U.S. Cl.
CPC .............. *H02J 50/10* (2016.02); *H01F 38/14* (2013.01); *H02J 50/80* (2016.02); *H04B 5/0031* (2013.01);
(Continued)

(58) Field of Classification Search
CPC . H02J 5/005; H02J 7/025; H02J 17/00; B60L 11/182
See application file for complete search history.

(56) References Cited

U.S. PATENT DOCUMENTS

| 2013/0043833 A1* | 2/2013 | Katz ..................... H01M 10/46 320/108 |
| 2013/0147281 A1* | 6/2013 | Kamata .................. H02J 17/00 307/104 |

(Continued)

FOREIGN PATENT DOCUMENTS

| EP | 2581994 A1 | 4/2013 |
| WO | 2008044875 A1 | 4/2008 |

OTHER PUBLICATIONS

"PWM voltage boost for mosfet", Nov. 16, 2015, StackExchange, retrieved Sep. 25, 2018 from <https://electronics.stackexchange.com/questions/201127/pwm-voltage-boost-for-mosfet>.*
(Continued)

*Primary Examiner* — Rexford N Barnie
*Assistant Examiner* — David A Shiao
(74) *Attorney, Agent, or Firm* — Barley Snyder

(57) ABSTRACT

A power receiving connector for a contactless connector system is disclosed. The power receiving connector comprises a secondary inductive coupler electromagnetically coupled with a primary inductive coupler of a power transmitting connector, the secondary inductive coupler receiving electric power from the primary inductive coupler, a terminal connected to a secondary external component and outputting the electric power to the secondary external component, a switch connected to the terminal and controlling the electric power output at the terminal, a secondary data transceiver forming a data link with a primary data transceiver of the primary inductive coupler, and a secondary data communication interface connected to the secondary data transceiver and communicating with the secondary external component.

18 Claims, 5 Drawing Sheets

(51) Int. Cl.
   *H02J 50/80*   (2016.01)
   *H01F 38/14*   (2006.01)
(52) U.S. Cl.
   CPC ......... *H04B 5/0037* (2013.01); *H04B 5/0081* (2013.01); *H01F 2038/143* (2013.01)

(56) References Cited

U.S. PATENT DOCUMENTS

| | | | | |
|---|---|---|---|---|
| 2013/0147282 | A1* | 6/2013 | Sakamoto | H01F 38/14 307/104 |
| 2013/0193756 | A1* | 8/2013 | Fukaya | H02J 4/00 307/29 |
| 2013/0214611 | A1* | 8/2013 | Bae | H02M 7/06 307/104 |
| 2014/0145675 | A1* | 5/2014 | Shimizu | H01F 38/14 320/108 |
| 2014/0203661 | A1* | 7/2014 | Dayan | H01F 38/14 307/104 |
| 2014/0302782 | A1* | 10/2014 | Raab | H04B 5/0037 455/41.1 |
| 2015/0244176 | A1* | 8/2015 | Van Den Brink | H02J 5/005 307/104 |
| 2015/0288195 | A1* | 10/2015 | Ashery | H02J 5/005 307/104 |

OTHER PUBLICATIONS

European Search Report, dated Jun. 1, 2016, 7 pages.

* cited by examiner

CONTACTLESS CONNECTOR AND CONTACTLESS CONNECTOR SYSTEM

CROSS-REFERENCE TO RELATED APPLICATION

This application claims the benefit of the filing date under 35 U.S.C. § 119(a)-(d) of European Patent Application No. 15201336.3, filed on Dec. 18, 2015.

FIELD OF THE INVENTION

The present invention relates to a contactless connector system, and more particularly, to a contactless connector system for inductively transmitting power.

BACKGROUND

Inductive energy transfer in a contactless connector is known in which an inductor or a magnetic winding in a primary side power transmission device is magnetically coupled with an inductor or a magnetic winding in a secondary target device. Energy is inductively transferred between the primary side and the secondary side of the contactless connector; if the secondary side is removed from the primary side, the energy transfer is interrupted. In this context, the term "contactless" is used to indicate that energy transfer can be realized without any ohmic connection between corresponding electrical contacts on the primary side and secondary side, respectively.

Omission of electrical contacts is of great importance for many applications, such as in applications involving electric connections between a power source and sink in which technically complex plugs and cables can be avoided by application of inductive energy transfer ("IE"). Further, technical energy supply system components based on IE can be protected from environmental impacts without using mechanically complex connectors. Moreover, in some application areas for IE, the use of electrical connections has to be avoided in light of technical feasibility. Furthermore, the use of IE can improve the reliability of systems in which the devices and contacts are exposed to high stress, such as systems with rotating or moveable parts prone to wear due to friction.

A contactless connector system is disclosed in European patent specification EP 2581994 B1. The contactless connector system has primary side and secondary side inductive couplers that can be mated for wirelessly transmitting electric power from the primary to the secondary. A bi-directional data transmission is also established between two antennas, thereby establishing a radio frequency data link between the two parts of the connector system.

Another known contactless connector system is shown in FIG. 1. This contactless connector system 200 comprises a power transmitting connector 202 and a power receiving connector 204. The power transmitting connector 202 has a primary inductive coupler Lp which is powered from an input power source. The input power may for instance be a DC power which is transformed into an alternating voltage by means of a DC/DC converter 206 and a subsequent DC/AC converter 208. As this is schematically shown in FIG. 1, the inductive coupler Lp is part of a resonant circuit 210 which comprises a capacitor Cp in parallel to the inductive coupler Lp.

When the two mating surfaces 212, 214 of the power transmitting connector 202 and the power receiving connector 204 are sufficiently close, the secondary inductive coupler Ls is magnetically coupled to the primary inductive coupler Lp. The secondary inductive coupler Ls is part of a secondary resonant circuit 216. By means of the electromagnetic coupling, power is transmitted from the primary side to the secondary. The secondary resonant circuit 216 is connected to a rectifier circuit 218 (comprising for instance a bridge rectifier) and a subsequent DC/DC converter 224 generating a regulated DC output power.

In addition to the power transmission, the contactless connector system 200 is further equipped with means for establishing a bi-directional data link for transmitting data through the connector system 200. A primary side data communication interface 222 communicates with a primary external component connected to the power transmitting connector 202. A primary side data transceiver 224 having one or more antennas 226 converts the data signals from the communication interface 222 into radio signals and accordingly converts received radio signals into electrical data signals which are input into the communication interface 222.

The power receiving connector 204 is provided with a corresponding secondary data transceiver 228 having one or more antennae 230 which receive signals from the primary side and transmit signals from the secondary towards the primary side via a wireless near field radio link. A secondary data communication interface 232 is connected to the secondary data transceiver 228 for communicating with a second external component connected to the power receiving connector 204.

A primary control unit 234 controls the operation of the resonant circuit 210, the primary side data communication interface 222, and the primary side data transceiver 224.

Known contactless connector systems which transmit both power and data, however, can only be provided with updated firmware on the secondary power receiving side when there is sufficient power supply via the inductive transfer from the primary power transmitting side. Moreover, in known contactless connector systems, controlling a maximum output power requires a hardware modification.

SUMMARY

An object of the invention, among others, is to provide a power receiving connector of a contactless connector system that allows access to the power receiving connector even without a power supply from a power transmitting connector. The disclosed power receiving connector comprises a secondary inductive coupler electromagnetically coupled with a primary inductive coupler of a power transmitting connector, the secondary inductive coupler receiving electric power from the primary inductive coupler, a terminal connected to a secondary external component and outputting the electric power to the secondary external component, a switch connected to the terminal and controlling the electric power output at the terminal, a secondary data transceiver forming a data link with a primary data transceiver of the primary inductive coupler, and a secondary data communication interface connected to the secondary data transceiver and communicating with the secondary external component.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
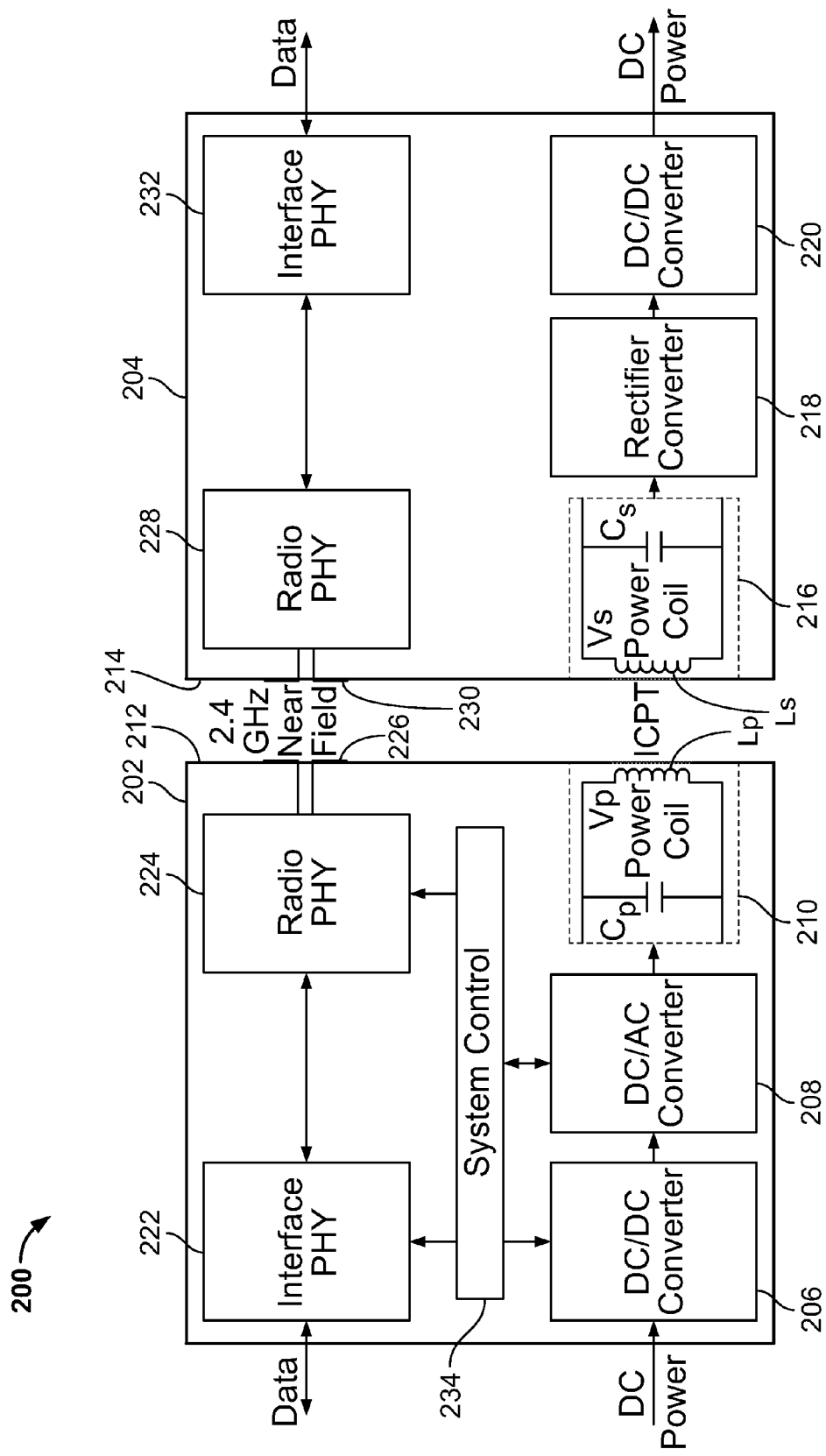
FIG. 1 is a block diagram of a contactless connector system known in the art.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

Figure 2:
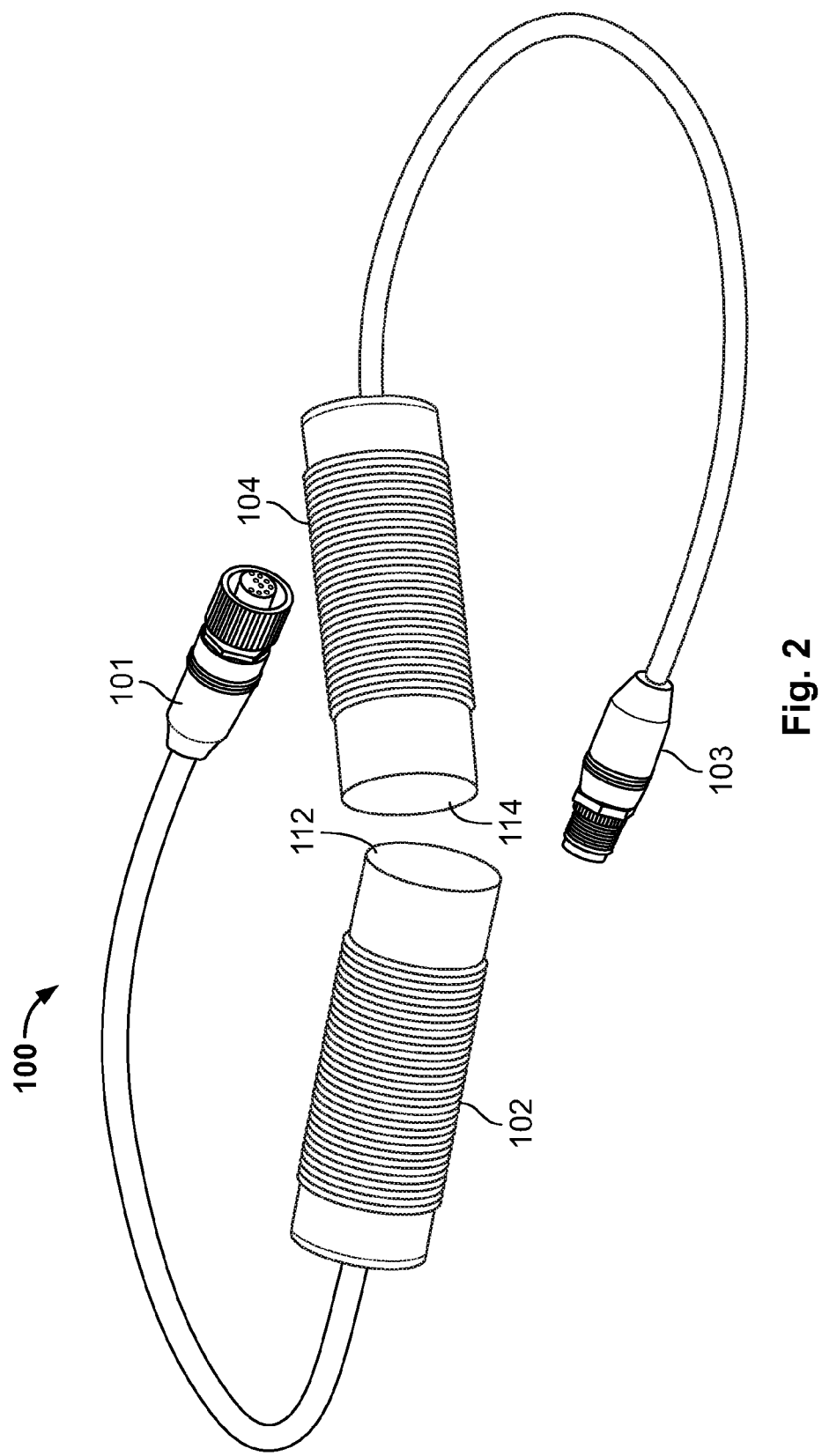
FIG. 2 is a perspective view of a contactless connector system according to the invention.

A contactless connector system 100 according to the invention is shown in FIG. 2. The contactless connector system 100 comprises a power transmitting connector 102 which can be connected to a power source via a first terminal 101. The power transmitting connector 102 defines a primary side of the contactless connector system 100. The contactless connector system 100 further comprises a power receiving connector 104 which defines a secondary side of the contactless connector system 100. The power receiving connector 104 can be connected to a secondary external component via a second terminal 103.

The power transmitting connector 102 has a transmitting mating surface 112 and the power receiving connector 104 has a receiving mating surface 114. When the transmitting mating surface 112 and the receiving mating surface 114 are brought sufficiently close to each other, the power receiving connector 104 is electromagnetically coupled with the power transmitting connector 102 so that a contactless inductive energy transfer from the primary side to the secondary can take place. In addition to allowing the inductive power transfer, the contactless connector system 100 is also able to provide a bi-directional data link between the two connectors 102, 104.

Figure 3:
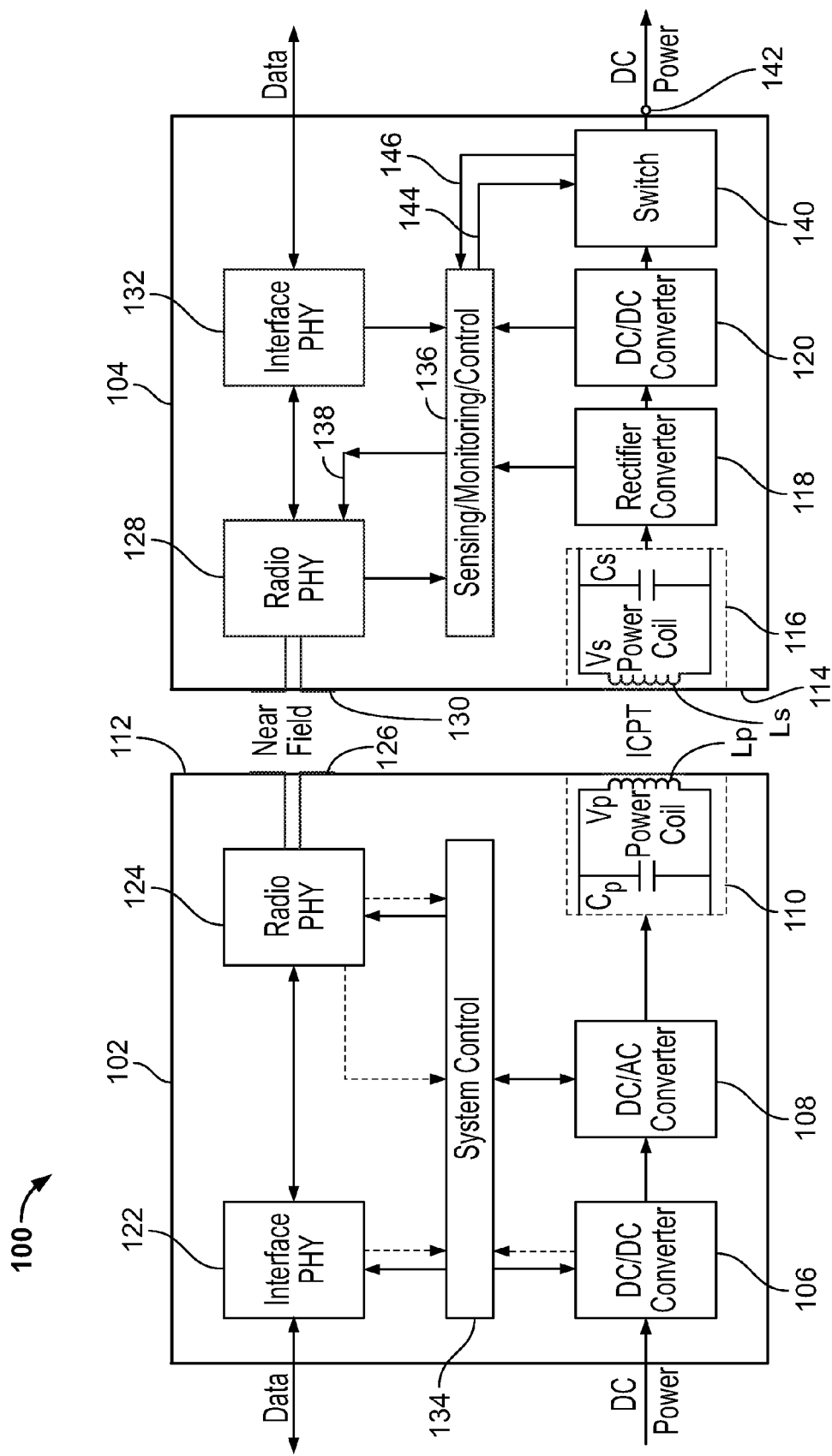
FIG. 3 is a block diagram of the contactless connector system of FIG. 2.

FIG. 3 is a block diagram of the power transmitting connector 102 and the power receiving connector 104. The power transmitting connector 102 has a primary inductive coupler Lp (also referred to as primary side power coil) which is powered from an input power source. The input power may for instance be a DC power which is transformed into an alternating voltage by means of a DC/DC converter 106 and a subsequent DC/AC converter 108. The inductive coupler Lp is part of a primary resonant circuit 110 which comprises a capacitor Cp in parallel to the inductive coupler Lp. The primary resonant circuit 110, however, may also be a serial resonant circuit.

When the two mating surfaces 112, 114 of the power transmitting connector 102 and the power receiving connector 104 are sufficiently close to each other, a secondary inductive coupler Ls is magnetically coupled to the primary inductive coupler Lp. The secondary inductive coupler Ls is part of a secondary resonant circuit 116. By means of the electromagnetic coupling, power is transmitted from the primary side to the secondary side. The secondary resonant circuit 116 is connected to a rectifier circuit 118 (comprising for instance a bridge rectifier) and a subsequent DC/DC converter 120 generating a regulated DC output power.

The contactless connector system 100 is further equipped with means for establishing a bi-directional data link for transmitting data through the connector system 100. A primary data communication interface 122 communicates with a primary external component connected to the power transmitting connector 102. A primary data transceiver 124 having one or more antennas 126 converts the data signals from the communication interface 122 into a radio signals and accordingly converts received radio signals into electrical data signals which are input into the communication interface 122. The power receiving connector 104 has a corresponding secondary data transceiver 128 forming the data link with the primary data transceiver 124; one or more antennas 130 of the secondary data transceiver 128 receives signals from the primary data transceiver 124 and can transmit signals from the secondary to the primary side via a wireless near field radio link. A secondary data communication interface 132 is connected to the secondary data transceiver 128 for communicating with a secondary external component connected to the power receiving connector 104.

A primary control unit 134 controls the operation of the primary resonant circuit 110, the primary data communication interface 122, and the primary data transceiver 124. Broken lines indicate an optional feedback from the primary data communication interface 122 and the primary data transceiver 124 to the primary control unit 134. The feedback provides information about parameters on the secondary side when a bidirectional communication between the power transmitting connector 102 and the power receiving connector 104 is implemented.

The power receiving connector 104, as shown in FIG. 3, has a switch 140 which is connected between the output of the DC/DC converter 120 and a terminal 142 connected to the secondary external component for providing DC power. By actuating the switch 140, the connection between the DC/DC converter 120 and the terminal 142 can be created or interrupted. A control signal 144 for actuating the switch 140 is generated by a secondary control unit 136 of the power receiving connector 104. The switch 140 can switch off based on the control signal 144 when a maximum output power threshold generated by the DC/DC converter 120 is reached or exceeded. The maximum output power threshold can be stored in a non-transitory computer readable medium at the secondary control unit 136. Software stored in the non-transitory computer readable medium and executed on a processor of the secondary control unit 136 can control the switch 140 and the output power at the terminal 142 based on parameters such as temperature, device type, distance, or other parameters without the need to modify the hardware of the power receiving connector 104.

The switch 140 also has a power supply line 146 extending from the terminal 142 to supply power to the secondary control unit 136. In order to provide power to the secondary control unit 136, an external power source, for instance a 24 V external power supply can be connected to the terminal 142. In an embodiment, the external power supply is part of the secondary external component to which the power receiving connector 104 is connected. By powering the secondary control unit 136 from the secondary side without the need of the connection to the primary side, the data link to the primary side can be maintained even if no power is received from the primary side.

The secondary sensing unit 136 also measures at least one secondary operational parameter and generates a control signal 138 based on the at least one secondary operational parameter which is transmitted to the primary side to be evaluated by the primary control unit 134. In other words, the data link between the power transmitting connector 102 and the power receiving connector 104 carries in addition to the payload data communicated between the two components which are interconnected by the contactless connector system additional control data which provides information about secondary parameters to the primary control unit 134. This information improves overall performance of the contact connector system 100. The primary control unit 134 may also comprise means for measuring one or more primary operational parameters on the primary side.

The following parameters can be monitored and controlled according to the present invention.

On the transmitter side, the following transmitter parameters can be measured:
a. The input voltage and input current, and as a result, the input power is known
b. The temperature of the power transmitting connector 102
c. The input voltage for the DC/AC converter 108
d. The voltage Vp across the primary inductive coupler Lp and the current through the primary inductive coupler Lp, and as a result, the transmitted power is known
e. Presence of data on the primary data communication interface 122, i.e. whether data is transmitted or not On the receiver side the following receiver parameters can be measured:
a. The output voltage and output current, and as a result, the output power is known.
b. The temperature of the power receiving connector 104
c. The voltage Vs across the secondary inductive coupler Ls and the current through the secondary inductive coupler Ls, and as a result, the received power is known
d. Presence of data on the secondary data communication interface 132, i.e. whether data is transmitted or not Having the information about the voltages Vp and Vs at the primary control unit 134 on the primary side allows the primary control unit 134 to determine the distance between the power transmitting connector 102 and the power receiving connector 104. Knowing the distance enables functionalities such as a reliable power-over-distance de-rating.

Figure 4:
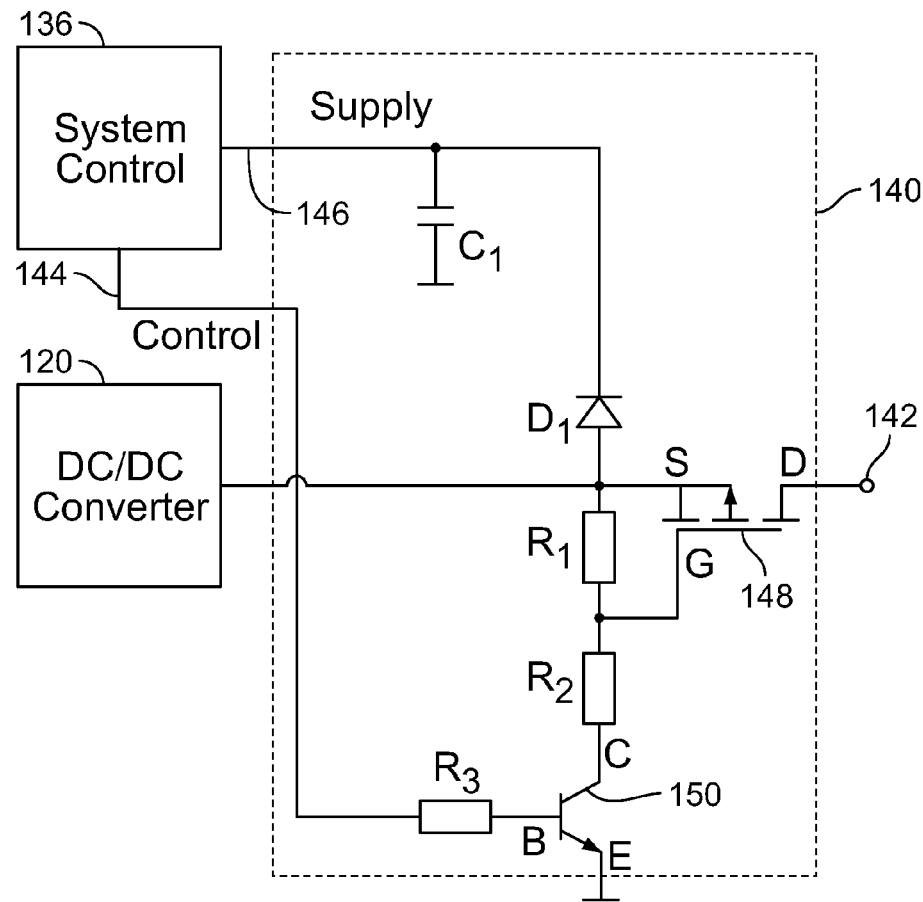
FIG. 4 is a circuit diagram of a switch of the contactless connector system of FIG. 3.

A circuit diagram of the switch 140 is shown in FIG. 4. A metal oxide semiconductor field effect transistor ("MOSFET") 148 is connected between the output of the DC/DC converter 120 and the terminal 142. The MOSFET 148 is a p-channel enhancement type MOSFET; it is normally off, i.e. no current flow is possible between the drain D and source S terminals when the voltage at the gate terminal G is zero.

In a first operational mode, the gate terminal G of the MOSFET 148 is connected to the control output 144 of the secondary control unit 136 and is controlled by the secondary control unit 136. A drive circuit for driving the gate of the MOSFET 148 comprises a level shifter having a bipolar transistor 150 and a voltage divider formed by a first resistor R1 and a second resistor R2. The level shifter having the bipolar transistor 150 provides a control voltage to the gate terminal G. The control output 144 of the secondary control unit 136 is connected via a third resistor R3 to the base B of the bipolar transistor 150. The secondary control unit 136 can thus connect or disconnect the terminal 142 with the DC/DC converter 120 in the first operational mode in which the MOSFET 148 is conductive.

Figure 5:
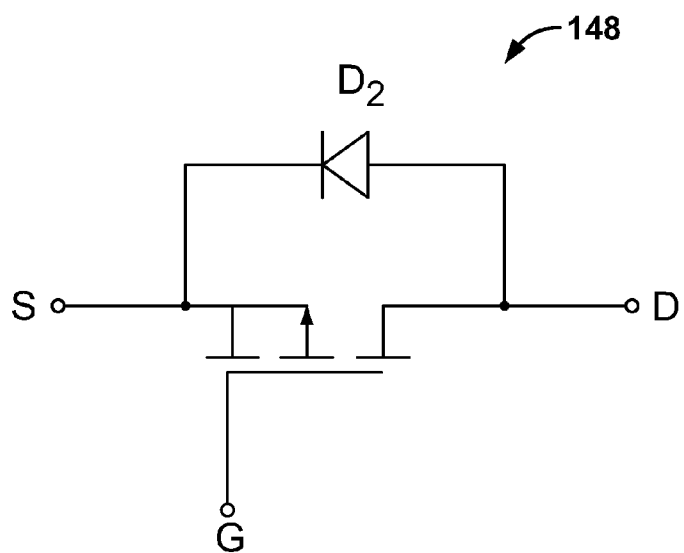
FIG. 5 is a schematic view of a MOSFET used in the switch of FIG. 4.

The MOSFET 148 may also provide a reverse current path for supplying power to the secondary control unit 136 in a second operational mode when the terminal 142 is connected to the external power supply. As shown in the circuit of FIG. 5, the MOSFET 148 has an intrinsic body diode D2 which is formed in the body/drain p-n junction connected between the drain D and source S regions of the MOSFET 148. The intrinsic body diode D2 can be used for supplying power to the power supply line 146 of the secondary control unit 136 in the second operational mode in which the MOSFET 148 is non-conductive. In another embodiment, an external diode can be added to the circuit in addition to the intrinsic body diode D2. As shown in FIG. 4, the power supply line 146 may be connected with an input capacitor C1. A switch diode D1 may be provided between the power supply line 146 and the MOSFET 148 with a cathode of the switch diode D1 connected to the power supply line 146 in order to block a discharging of the capacitor C1.

Figure 6:
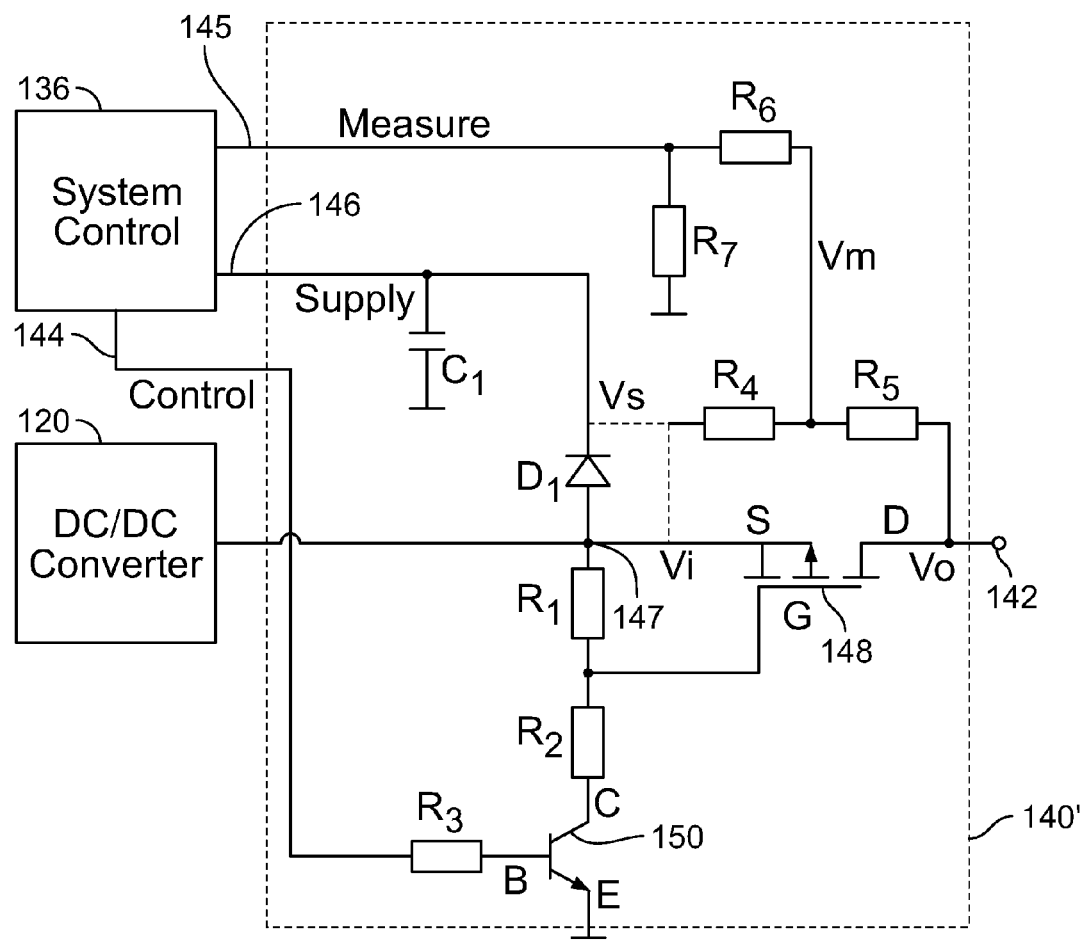
FIG. 6 is a circuit diagram of another switch of the contactless connector system of FIG. 3.

A switch 140' according to another embodiment of the invention is shown in the circuit diagram of FIG. 6. In addition to the components already explained with reference to FIG. 4, the switch 140' may further comprise a measurement section which measures a difference between the voltage of the DC/DC converter 120 and the voltage at the terminal 142. Such a measurement can be used, for example, for determining whether a short circuit occurs at the output.

As shown in FIG. 6, the secondary control unit 136 receives a measurement signal 145. The line transmitting the measurement signal 145 is connected to a resistor network comprising resistors R4, R5, R6, and R7. As indicated by broken lines, the resistor R4 may either be connected to a node 147 between the source terminal S of the MOSFET 148 and the output of the DC/DC converter 120, or to the power supply line 146 from the secondary control unit 136, depending on whether the voltage Vi from the DC/DC converter 120 or the voltage Vs from the power supply is to be monitored.

First, the DC/DC converter 120 can be switched off and the MOSFET 148 is open. In this case and for R4 being connected to the node 147, the voltage Vi is 0 V and the voltage Vo is 0 V, consequently, the measured voltage Vm transmitted as measurement signal 145 is also 0 V. Further, when the DC/DC converter 120 is operating normally, providing a DC voltage of 24 V, and the MOSFET 148 is open, Vi equals 24 V, and Vo equals 0 V. Therefore, a value of 12 V is measured as Vm, provided that the load resistance is much lower in value than the value of the combined resistance R4+R5. The third case is the regular operating mode: the DC/DC converter 120 operates normally and provides a DC voltage of 24 V, and the MOSFET 148 is closed. Consequently, Vi has a value of 24 V and Vo also has a value of 24 V; Vm is also 24 V. Lastly, in case of a short circuit to ground of the terminal 142 while the MOSFET 148 is closed, Vi and Vo are both 0 V and the measured voltage Vm is also 0 V. Therefore, a short circuit to ground can be detected at the measurement terminal by detecting a 0 V signal while the MOSFET 148 is closed.

Advantageously, in the power receiving connector 104 of the contactless connector system 100 according to the invention, by providing the switch 140, the secondary control unit 136 of the power receiving connector 104 can be powered externally via the terminal 142 in case the power receiving connector 104 does not receive power from the primary side. This is advantageous when it becomes necessary to perform maintenance on the power receiving connector 104 without having a connection to the corresponding power transmitting connector 102, for example, when installing or modifying the firmware stored in the secondary control unit 136. Furthermore, when the corresponding power transmitting connector 102 is connected but does not provide electric power, such as during start up of the contactless connector system 100, data reception and/or transmission is still possible by using the external power supply on the secondary side for powering the transceiver 128, the data communication interface 132, and the secondary control unit 136. Moreover, the switch 140 can be controlled to interrupt a power supply from the DC/DC converter 120 to the terminal 142, allowing for a particularly simple and effective way of controlling a maximum power output by the power receiving connector 104 or switching off the output in the case of a short circuit.

What is claimed is:

1. A power receiving connector for a contactless connector system, comprising:
   a secondary inductive coupler electromagnetically coupled with a primary inductive coupler of a power transmitting connector, the secondary inductive coupler receiving electric power from the primary inductive coupler;
   a terminal connected to a secondary external component, outputting the electric power to the secondary external component, and receiving power from an external power source different from the power transmitting connector connected to the terminal to supply power to the power receiving connector;
   a switch connected to the terminal and controlling the electric power output at the terminal;
   a secondary data transceiver forming a data link with a primary data transceiver of the primary inductive coupler; and
   a secondary data communication interface connected to the secondary data transceiver and communicating with the secondary external component, the secondary external component and the external power source are external to a structure of the power receiving connector containing the secondary inductive coupler, the switch, the secondary data transceiver, and the secondary data communication interface.

2. The power receiving connector of claim 1, further comprising a secondary control unit connected to and controlling an operation of the secondary data communication interface and the secondary data transceiver.

3. The power receiving connector of claim 2, wherein the secondary control unit has a power supply line through which the secondary control unit is supplied with electric power, the switch selectively connecting the power supply line either to the secondary inductive coupler or the terminal.

4. The power receiving connector of claim 3, wherein the switch has a metal oxide semiconductor field effect transistor with a gate terminal, a source terminal, and a drain terminal, the metal oxide semiconductor field effect transistor capable of connecting the secondary inductive coupler to the terminal and the terminal to the power supply line.

5. The power receiving connector of claim 4, wherein the terminal and the power supply line are connected via an intrinsic body diode of the metal oxide semiconductor field effect transistor.

6. The power receiving connector of claim 5, wherein the metal oxide semiconductor field effect transistor is a p-channel enhancement metal oxide semiconductor field effect transistor.

7. The power receiving connector of claim 5, wherein a switch diode is disposed between the power supply line and the metal oxide semiconductor field effect transistor.

8. The power receiving connector of claim 4, wherein the secondary control unit is connected to and controls an operation of the switch.

9. The power receiving connector of claim 8, wherein the gate terminal is connected to a drive circuit controlled by the secondary control unit.

10. The power receiving connector of claim 9, wherein the drive circuit comprises a level shifter having a bipolar transistor providing a control voltage to the gate terminal.

11. A contactless connector system, comprising:
    a power transmitting connector having a primary inductive coupler connected to an input power source, a resonant circuit generating a magnetic field at the primary inductive coupler, a primary data transceiver, a primary data communication interface connected to the primary data transceiver and communicating with a primary external component, and a primary control unit controlling an operation of the resonant circuit, the primary data communication interface, and the primary data transceiver; and
    a power receiving connector having a secondary inductive coupler electromagnetically coupled with the primary inductive coupler, the secondary inductive coupler receiving electric power from the primary inductive coupler, a terminal connected to a secondary external component, outputting the electric power to the secondary external component, and receiving power from an external power source different from the power transmitting connector connected to the terminal to supply power to the power receiving connector, a switch connected to the terminal and controlling the electric power output at the terminal, a secondary data transceiver forming a data link with the primary data transceiver, and a secondary data communication interface connected to the secondary data transceiver and communicating with the secondary external component, the secondary external component and the external power source are external to a structure of the power receiving connector containing the secondary inductive coupler, the switch, the secondary data transceiver, and the secondary data communication interface.

12. The contactless connector system of claim 11, wherein the primary data transceiver has a primary antenna and the secondary data transceiver has a secondary antenna, the primary antenna and the secondary antenna in radio communication.

13. A method of controlling a contactless connector system for inductively transmitting power between a power transmitting connector and a power receiving connector, comprising in a first operational mode:
    generating a magnetic field at a primary inductive coupler of the power transmitting connector by transforming an input power using a resonant circuit;
    receiving electric power at a secondary inductive coupler of the power receiving connector electromagnetically coupled with the primary inductive coupler and outputting the electric power to a secondary external component connected to a terminal of the power receiving connector; and
    establishing a data link between the power transmitting connector and the power receiving connector to provide communication with the secondary external component via a secondary data communication interface of the power receiving connector;
the method further comprising, in a second operational mode:

controlling a switch of the power receiving connector to disconnect a power supply line of a secondary control unit of the power receiving connector from the secondary inductive coupler and connect the power supply line to the terminal of the power receiving connector connected to an external power source, the secondary external component and the external power source are external to a structure of the power receiving connector containing the secondary inductive coupler, the switch, and the secondary data communication interface, the secondary control unit is supplied with power received by the secondary inductive coupler electromagnetically coupled to the primary inductive coupler in the first operational mode, and the secondary inductive coupler is not coupled to the primary inductive coupler in the second operational mode.

14. The method of claim 13, wherein the switch is controlled by the secondary control unit.

15. The method of claim 14, wherein the secondary control unit controls the switch to be non-conductive and output no power at the terminal when a power level received from the power transmitting connector exceeds a threshold.

16. The method of claim 13, wherein the switch is a metal oxide semiconductor field effect transistor which is conductive in the first operational mode and non-conductive in the second operational mode.

17. The method of claim 16, wherein the terminal and the power supply line are connected via an intrinsic body diode of the metal oxide semiconductor field effect transistor.

18. The method of claim 13, wherein the external power source is connected to the terminal in the second operational mode.

* * * * *